United States Patent
Li et al.

(10) Patent No.: US 10,781,562 B1
(45) Date of Patent: Sep. 22, 2020

(54) CONSTRUCTION METHOD FOR REINFORCING LOESS EMBANKMENT BY COMBINING MICROBIAL MINERALIZATION WITH PHOSPHOGYPSUM

(71) Applicant: Institute of Geology and Geophysics, Chinese Academy of Sciences, Beijing (CN)

(72) Inventors: Zhiqing Li, Beijing (CN); Shengwen Qi, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/900,146

(22) Filed: Jun. 12, 2020

(30) Foreign Application Priority Data

Apr. 20, 2020 (CN) .......................... 2020 1 0313313

(51) Int. Cl.

| | |
|---|---|
| *E01C 21/00* | (2006.01) |
| *C04B 28/34* | (2006.01) |
| *C04B 24/12* | (2006.01) |
| *C04B 22/12* | (2006.01) |
| *E01C 3/00* | (2006.01) |
| *E01C 3/04* | (2006.01) |
| *C09K 17/44* | (2006.01) |
| *C04B 111/00* | (2006.01) |
| *C04B 103/00* | (2006.01) |

(52) U.S. Cl.
CPC ............ *E01C 21/00* (2013.01); *C04B 22/124* (2013.01); *C04B 24/126* (2013.01); *C04B 28/344* (2013.01); *C09K 17/44* (2013.01); *E01C 3/003* (2013.01); *E01C 3/04* (2013.01); *C04B 2103/0001* (2013.01); *C04B 2111/0075* (2013.01)

(58) Field of Classification Search
CPC . E01C 3/003; E01C 3/04; E01C 21/00; C04B 22/124; C04B 24/126; C04B 28/344; C04B 2103/0001; C04B 2111/0075; C09K 17/44
USPC .......................................... 404/17–31, 72–75
See application file for complete search history.

(56) References Cited

U.S. PATENT DOCUMENTS

| | | | |
|---|---|---|---|
| 2011/0262640 A1* | 10/2011 | Dosier .................... | C04B 24/14 427/215 |
| 2013/0192783 A1* | 8/2013 | Devenney .............. | D21H 17/66 162/181.2 |
| 2016/0236943 A1* | 8/2016 | Kavazanjian ............ | C12N 9/78 |
| 2016/0264463 A1* | 9/2016 | Dosier .................... | C12N 11/02 |
| 2018/0119185 A1* | 5/2018 | Kavazanjian ............. | C12P 9/00 |
| 2019/0210924 A1* | 7/2019 | Royne ..................... | C04B 28/10 |
| 2020/0063392 A1* | 2/2020 | Wasman ................. | E02D 27/26 |

* cited by examiner

*Primary Examiner* — Raymond W Addie
(74) *Attorney, Agent, or Firm* — Ostrager Chong Flaherty & Broitman P.C.

(57) ABSTRACT

A construction method for reinforcing a loess embankment by combining microbial mineralization with phosphogypsum. The method includes: (1) placing *Bacillus pasteurii* in a culture medium to prepare a microbial solution, and mixing urea, calcium chloride and water to prepare a cementing solution; (2) mixing a mixture, the microbial solution and water well, and adding the cementing solution and water to prepare an improving mixture; and (3) leveling and compacting an original ground; laying a geomembrane, the improving mixture and a geogrid; laying a last geomembrane on the top of the embankment after the embankment is laid, and then laying a roadbed. The method meets the improvement and construction requirements of loess embankments of high-grade highways, and reduces the stock of phosphogypsum, thereby reducing the occupation of cultivated land. The microbial improvement of the phosphogypsum achieves the immobilization of harmful elements, thereby reducing environmental pollution.

7 Claims, No Drawings

CONSTRUCTION METHOD FOR REINFORCING LOESS EMBANKMENT BY COMBINING MICROBIAL MINERALIZATION WITH PHOSPHOGYPSUM

TECHNICAL FIELD

The present invention relates to the field of subgrade engineering, and in particular to a construction method for reinforcing a loess embankment by combining microbial mineralization with phosphogypsum.

BACKGROUND

Loess is collapsible, poor to resist erosion, and prone to serious soil erosion. The pavement will sink due to the infiltration of rainwater or the rise of groundwater into the loess embankment. The conventional reinforcement methods of the loess embankment include cement modification, lime modification, dynamic compaction, compaction piles and other engineering measures. These improvement methods can increase the bearing capacity of the subgrade to some extent, but if they fail, the pavement will settle unevenly.

Phosphogypsum is a byproduct produced in the production of phosphoric acid with apatite and sulfuric acid by wet process in chemical plants. The production of 1 ton of phosphoric acid yields about 5 tons of phosphogypsum. Phosphogypsum is a powdery material with little plasticity. It is slightly acidic due to the residual phosphoric acid, sulfuric acid and hydrofluoric acid. In addition, phosphogypsum is rich in available phosphorus, which can be used for plant growth. China produces more than 8 million tons of phosphogypsum every year. By the end of 2011, China had overstocked more than 300 million tons of phosphogypsum. If the phosphogypsum is applied to engineering design through technical measures, the overstocked phosphogypsum will be greatly reduced. This will save the land resources, avoid the collapse of phosphogypsum dams, and turn waste into treasure to give play to the benefits of phosphogypsum.

The soil contains a large number of microbes, and functional microbes can be selected and cultured for cementing soil particles, solidifying the soil, and improving the bearing capacity of the subgrade.

SUMMARY

An objective of the present invention is to provide a construction method for reinforcing a loess embankment by combining microbial mineralization with phosphogypsum. The present invention increases the bearing capacity of the loess embankment by improvement, and reduces the stock of solid phosphogypsum waste, saving the land resources and turning waste into treasure.

The present invention adopts the following technical solution: a construction method for reinforcing a loess embankment by combining microbial mineralization with phosphogypsum, including the following steps:

(1) placing *Bacillus pasteurii* in a culture medium to prepare a microbial solution, and mixing urea, calcium chloride and water to prepare a cementing solution;

(2) mixing a mixture, the microbial solution and water well, and adding the cementing solution and water to prepare an improving mixture;

(3) leveling and compacting an original ground; laying a first geomembrane, laying a first layer of improving mixture on the first geomembrane, and compacting until a desired compactness; then laying a second geomembrane on the top of the first layer of improving mixture, laying a second layer of improving mixture on the second geomembrane, and compacting until a desired compactness;

(4) laying a first geogrid on the top of the second layer of improving mixture, laying a third layer of improving mixture on the first geogrid, and compacting until a desired compactness, where one geogrid is laid every three layers of improving mixture; and (5) laying a last geomembrane on the top of the embankment after the embankment is laid, and then laying a roadbed.

In step (1), a mixed solute in the culture medium includes bean pulp, $(NH_4)_2SO_4$, $Na_2HPO_4$ and NaOH; 40 parts of bean pulp, 10 parts of $(NH_4)_2SO_4$, 3.55 parts of $Na_2HPO_4$ and 40 parts of NaOH are weighed by mass to prepare the mixed solute of the culture medium; the mixed solute of the culture medium is mixed with water to prepare a liquid medium; the content of the bean pulp in the liquid medium is controlled at 20-60 g/L; the liquid medium is sealed and sterilized in an autoclave at 121° C. for 25 min, and then cooled to 30±2° C. for use; 1 part by volume of *Bacillus pasteurii* solution is added to 100 parts by volume of liquid medium to prepare the microbial solution; the microbial solution is placed into a constant-temperature shaking incubator at 30° C., and shook at 200 rpm for more than 24 h until an optical density of the *Bacillus pasteurii* in the microbial solution at a wavelength of 600 nm ($OD_{600}$) is 1.5±0.2.

In step (1), the mixed solute in the cementing solution includes urea and calcium chloride; 2 parts of granular urea and 1 part of powdered calcium chloride are weighed by mass to prepare the mixed solute, and the mixed solute is mixed with water to prepare the cementing solution with a concentration of 0.5±0.1 mol.

In step (2), the mixture includes phosphogypsum, alkaline slag and loess; 3 parts of phosphogypsum, 7 parts of alkaline slag and 90 parts of loess are weighed by dry mass, and are mixed well to obtain the mixture.

In step (2), 50-60 parts of mixture, 2 parts of microbial solution, 10 parts of cementing solution and 8 parts of water are weighed by volume; 50-60 parts of mixture, 2 parts of microbial solution and 4 parts of water are first mixed well, and then 10 parts of cementing solution and 4 parts of water are added and mixed well to prepare the improving mixture; the microbial solution and the cementing solution are each added once in the whole process.

In step (3), the prepared improving mixture is laid and rolled in 6 h; each layer of improving mixture is loosely laid with a thickness of 30-40 cm, and compacted with a roller; the geomembrane is a high-density polyethylene anti-seepage geomembrane.

In step (3), the geogrid is a biaxially oriented polypropylene (BOPP) geogrid, with a longitudinal/transverse tensile strength of not less than 30 kN/m.

Advantages of the Present Invention

The construction method is simple. It meets the improvement and construction requirements of loess embankments of high-grade highways, and reduces the stock of solid phosphogypsum waste, thereby reducing the occupation of cultivated land, and turning waste into treasure. The microbial culture uses a cheap medium, which reduces the operation cost. The microbial improvement of the phosphogypsum achieves the immobilization of harmful elements, thereby reducing environmental pollution.

Applications of the Present Invention

Construction of expressway embankment engineering and subgrade engineering of first-grade highways and other grades of highways, etc.

DETAILED DESCRIPTION

Example: a construction method for reinforcing a loess embankment by combining microbial mineralization with phosphogypsum, including the following steps:

(1) Prepare a culture medium and a microbial solution: weigh 40 kg of bean pulp, 10 kg of $(NH_4)_2SO_4$, 3.55 kg of $Na_2HPO_4$ and 40 kg of NaOH to prepare a mixed solute of the culture medium; mix the mixed solute of the culture medium with 1,000 kg of water to prepare a liquid medium; seal and sterilize the liquid medium in an autoclave at 121° C. for 25 min, and then cool to 30° C. for use; add 10 L of *Bacillus pasteurii* solution to the liquid medium to prepare the microbial solution; place the microbial solution into a constant-temperature shaking incubator at 30° C., and shake at 200 rpm for more than 24 h until an optical density of the *Bacillus pasteurii* in the microbial solution at a wavelength of 600 nm ($OD_{600}$) is 1.5.

(2) Prepare a cementing solution: weigh 1,200 kg of urea and 600 kg of calcium chloride, mix with water to prepare 10,100 L of cementing solution with a concentration of 0.5 mol.

(3) Prepare a mixture: weigh 2.42 t of phosphogypsum, 5.64 t of alkaline slag and 72.54 t of loess, and mix well to obtain the mixture.

(4) Prepare an improving mixture: mix 57.57 m³ of mixture, 2.02 m³ of microbial solution and 4.04 m³ of water well; then add 10.1 m³ of cementing solution and 4.04 m³ of water, and mix well to obtain the improving mixture, where the mixture has a bulk density of 1.4 g/cm³.

(5) Level and compact an original ground; lay a first geomembrane, lay a first layer of improving mixture on the first geomembrane, and compact until a desired compactness; then lay a second geomembrane on the top of the first layer of improving mixture, lay a second layer of improving mixture on the second geomembrane, and compact until a desired compactness.

(4) Lay a first geogrid on the top of the second layer of improving mixture, lay a third layer of improving mixture on the first geogrid, and compact until a desired compactness, where one geogrid is laid every three layers of improving mixture.

(5) Lay a last geomembrane on the top of the embankment after the embankment is laid, and then lay a roadbed.

We claim:

1. A construction method for reinforcing a loess embankment by combining microbial mineralization with phosphogypsum, comprising the following steps:
    (1) placing *Bacillus pasteurii* in a culture medium to prepare a microbial solution, and mixing urea, calcium chloride and water to prepare a cementing solution;
    (2) the microbial solution and water, and adding the cementing solution to prepare an improving mixture;
    (3) leveling and compacting an original ground; laying a first geomembrane, laying a first layer of improving mixture on the first geomembrane, and compacting until a desired compactness; then laying a second geomembrane on the top of the first layer of improving mixture, laying a second layer of improving mixture on the second geomembrane, and compacting until a desired compactness;
    (4) laying a first geogrid on the top of the second layer of improving mixture, laying a third layer of improving mixture on the first geogrid, and compacting until a desired compactness, wherein one geogrid is laid every three layers of improving mixture; and
    (5) laying a last geomembrane on the top of the embankment after the embankment is laid, and then laying a roadbed.

2. The construction method for reinforcing a loess embankment by combining microbial mineralization with phosphogypsum according to claim 1, wherein in step (1), a mixed solute in the culture medium comprises bean pulp, $(NH_4)_2SO_4$, $Na_2HPO_4$ and NaOH; 40 parts of bean pulp, 10 parts of $(NH_4)_2SO_4$, 3.55 parts of $Na_2HPO_4$ and 40 parts of NaOH are weighed by mass to prepare the mixed solute of the culture medium; the mixed solute of the culture medium is mixed with water to prepare a liquid medium; the content of the bean pulp in the liquid medium is controlled at 20-60 g/L; the liquid medium is sealed and sterilized in an autoclave at 121° C. for 25 min, and then cooled to 30±2° C. for use; 1 part by volume of *Bacillus pasteurii* solution is added to 100 parts by volume of liquid medium to prepare the microbial solution; the microbial solution is placed into a constant-temperature shaking incubator at 30° C., and shook at 200 rpm for more than 24 h until an optical density of the *Bacillus pasteurii* in the microbial solution at a wavelength of 600 nm ($OD_{600}$) is 1.5±0.2.

3. The construction method for reinforcing a loess embankment by combining microbial mineralization with phosphogypsum according to claim 1, wherein in step (1), the mixed solute in the cementing solution comprises urea and calcium chloride; 2 parts of granular urea and 1 part of powdered calcium chloride are weighed by mass to prepare the mixed solute, and the mixed solute is mixed with water to prepare the cementing solution with a concentration of 0.5±0.1 mol.

4. The construction method for reinforcing a loess embankment by combining microbial mineralization with phosphogypsum according to claim 1, wherein in step (2), the mixture comprises phosphogypsum, alkaline slag and loess; 3 parts of phosphogypsum, 7 parts of alkaline slag and 90 parts of loess are weighed by dry mass, and are mixed well to obtain the mixture.

5. The construction method for reinforcing a loess embankment by combining microbial mineralization with phosphogypsum according to claim 1, wherein in step (2), 50-60 parts of mixture, 2 parts of microbial solution, 10 parts of cementing solution and 8 parts of water are weighed by volume; 50-60 parts of mixture, 2 parts of microbial solution and 4 parts of water are first mixed well, and then 10 parts of cementing solution and 4 parts of water are added and mixed well to prepare the improving mixture; the microbial solution and the cementing solution are each added once in the whole process.

6. The construction method for reinforcing a loess embankment by combining microbial mineralization with phosphogypsum according to claim 1, wherein in step (3), the prepared improving mixture is laid and rolled in 6 h; each layer of improving mixture is loosely laid with a thickness of 30-40 cm, and compacted with a roller; the geomembrane is a high-density polyethylene anti-seepage geomembrane.

7. The construction method for reinforcing a loess embankment by combining microbial mineralization with phosphogypsum according to claim 1, wherein in step (4), the geogrid is a biaxially oriented polypropylene (BOPP) geogrid, with a longitudinal/transverse tensile strength of not less than 30 kN/m.

\* \* \* \* \*

UNITED STATES PATENT AND TRADEMARK OFFICE
CERTIFICATE OF CORRECTION

PATENT NO. : 10,781,562 B1
APPLICATION NO. : 16/900146
DATED : September 22, 2020
INVENTOR(S) : Zhiqing Li and Shengwen Qi Page 1 of 1

It is certified that error appears in the above-identified patent and that said Letters Patent is hereby corrected as shown below:

In the Claims

In Claim 1 at Column 3, Line 62, the word --mixing-- should be inserted after '(2)' and before 'the microbial solution and water,'

Signed and Sealed this
Twentieth Day of October, 2020

Andrei Iancu
*Director of the United States Patent and Trademark Office*